April 13, 1965   M. A. WEISS ETAL   3,178,012
CONTINUOUS SPIRAL TRACK CONVEYOR
Filed Nov. 19, 1962
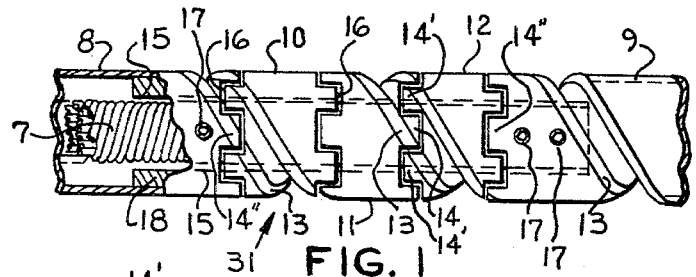
FIG. 1
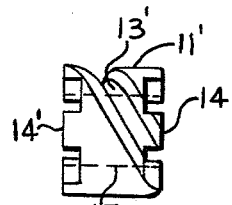
FIG. 2
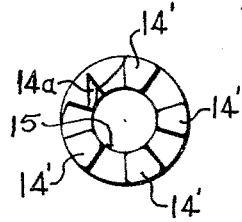
FIG. 3
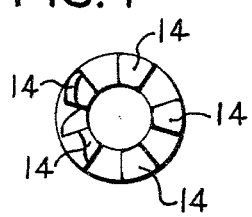
FIG. 4
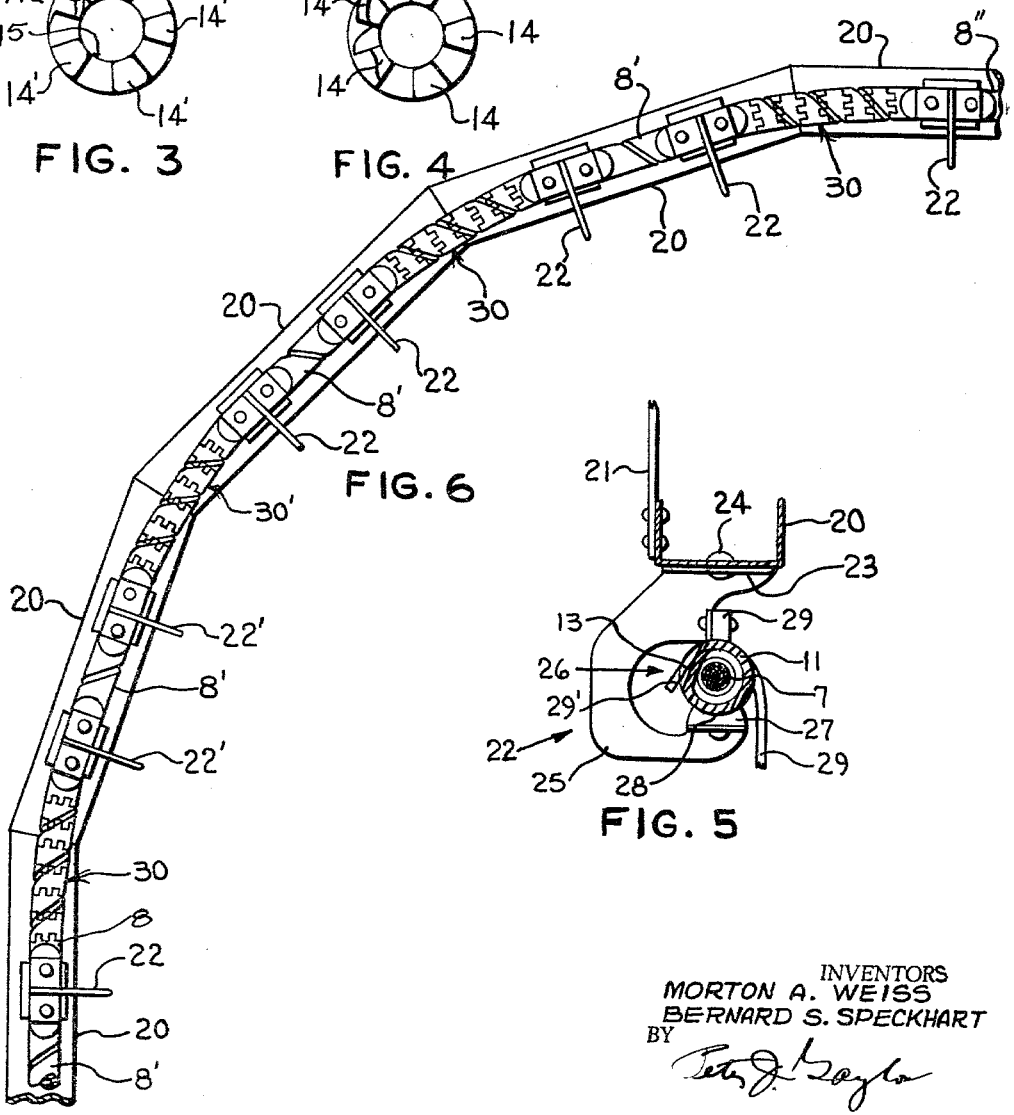
INVENTORS
MORTON A. WEISS
BERNARD S. SPECKHART
BY
ATTORNEY 3,178,012
CONTINUOUS SPIRAL TRACK CONVEYOR
Morton A. Weiss, Springfield, and Bernard S. Speckhart, Union, N.J., assignors to White Machine Co., Inc., Kenilworth, N.J., a corporation of New Jersey
Filed Nov. 19, 1962, Ser. No. 238,480
3 Claims. (Cl. 198—213)

This invention relates to curving means for screw conveyors and, particularly, for spiral track conveyors. More specifically it deals with a curved sectional spiral track conveyor mounted on a centrally-disposed flexible cable, each of said sections carrying a portion of the track and comprising a tube carrying axially-projecting teeth designed to mesh with teeth of adjacent sections.

Tubular conveyors provided with a continuous spiral track are being used widely, particularly in the dry cleaning field, where hangers bearing clothing must be transported from one portion of an establishment to another. A very effective type of conveyor for this purpose is described in copending application Serial No. 177,099, filed on March 2, 1962, by Morton A. Weiss and Bernard S. Speckhart. The present invention is adaptable for use with said latter conveyor system wherein a continuous spiral groove is hammered into the surface of a metal tube. The latter is rotated to transport hangers mounted thereon.

The present invention provides a highly useful and serviceable curving means to effect the transportation of hangers and similar loads around curves from one straight section of conveyor to another. The invention will be more readily understood by reference to the accompanying drawing in which a preferred embodiment is described and in which FIGURE 1 depicts a side view of a length of the sectional curving of the present invention, with an end portion partly cut away, while FIGURE 2 illustrates a side view of one dentigerous section of said curving. FIGURES 3 and 4 present front (left) and rear (right) views of the section depicted in FIGURE 2, while FIGURE 5 illustrates a hanger serving as a ceiling mounting for said curving. A bottom view of a 90° curve of a tubular conveyor employing such curving sections, is shown in FIGURE 6. Similar numerals refer to similar parts in the various figures.

Referring again to the drawing, numeral 7 referes to a conventional flexible cable made of spirally-wound wires, and serving as the central holding means for the hereinafter-mentioned cylindrical sections, as well as the ends of straight sections 8 and 9 of the tubular conveyor, between which are mounted the cylindrical sections 10, 11, and 12 of the curving for the conveyor. Although three such sections are shown here for illustration purposes, more are employed in actual use, as, for example, eight such sections, when used in abutting relation, effect a curvature of about 22½°. The track of the conveyor, over which the load is carried, is helical groove 13 or 13' which progresses spirally and continuously around the straight and curving sections. Hangers of clothing, for example, when placed in groove 13 (FIG. 1) will travel to the right as the tubing is rotated in a counter clockwise direction at the left end.

Each section 10, 11, 12 of the curving is a cylinder carrying a portion of track 13, and is provided with axially-projecting teeth 14 at the periphery, said teeth meshing with oppositely-directed similarly-projecting teeth 14' of adjacent sections. The sections are provided with centrally-disposed hole 15 through which is inserted closely-fitting flexible cable 7. The terminus of each straight section 8 or 9 leading to a curving also is provided with similarly meshing teeth 14'' which mesh with the projecting teeth of the immediately-adjacent section of the curve.

Adequate free space 16 between the teeth is provided to permit bending of the assembly into the form of an arc. Cable 7 is anchored at its ends by means of set screws 17 to the ends 8 and 9 of straight sections of the conveyor, or by other similar means.

In the case of a 1" O.D. tubular conveyor, for example, cable 7 may be ½" in diameter, fitting into a slightly larger hole 15 in sections 10, 11 and 12 and in ends 8 and 9. Groove 13 may have a pitch of one revolution every 1½". Sections 10, 11 and 12 may be about ⅞" long, between teeth ends, the teeth being about 9/32" wide at the periphery and about 5/32" at hole 15. About 5 such teeth of about 3/16" depth have been found suitable for the type of conveyor set forth above. Straight tubing ends 8 and 9 may be filled with babbitt or similar low melting alloy 18 up to hole 15 to provide adequate anchoring and centering of cable 7 therein.

As illustrated in FIGURES 2–4, each cylindrical section 11' carries forwardly-projecting teeth 14' and rearwardly-projecting teeth 14. These teeth extend from the periphery, so that some of them, such as tooth 14a (FIG. 3), which happens to be disposed in groove 13', do not have the thickness of other teeth. When the dentigerous sections are mounted on cable 7 and connected to straight section ends 8 and 9, for example, it is desirable that the arc of curvature be not too great as to cause disengagement of the teeth of adjacent dentigerous sections at the outside of the arc. If such a precaution is maintained, a hanger will travel over the curved sectional conveyor with ease and without any danger of snagging.

As in the case of the conveyor disclosed in the aforesaid application Serial No. 177,099, the present conveyor (both straight sections and curved) is mounted for use on hangers such as those depicted in FIG. 5. A channel member 20 is attached to a ceiling, for example, by arm 21, and the hanger, designated generally as 22, is attached at plate 23 by screws or rivets 24. The hanger preferably is a downwardly-projecting sheet metal member 25 having an open jaw 26 into which the tubular conveyor 11 is inserted. The conveyor rotates on self-lubricated plastic bearing 27 having a concave bearing 28. A plastic guide 29 prevents the conveyor from jumping out of the bearing. Groove 13 is deep enough to imbed entirely hanger 29 which is placed so that the hook end 29' is inside the jaw.

As is apparent from FIGURE 6, it is often desirable to alternate a length of dentigerous section 30 with short straight length of conveyor tubing to effect a curve in the conveyor. The 90° curve depicted in FIGURE 6 is made on a 30" radius. Here the long straight length of conveyor tubing 8' has end 8 mounted in hanger 22 and is connected, as indicated in detail in FIGURE 1, to length 30 of a curved dentigerous section. For example, curved dentigerous section 30 is about 5⅝" long and is connected at its end to an end of another straight section 8' which is mounted at its ends by hangers 22'. This section of straight tubing 8' is about 6½" long. Similarly, straight length 8' then is connected to another 5⅝" curved length of dentigerous sections 30', etc., until length 8" of straight conveyor is reached, disposed at 90° to conveyor 8'.

As is apparent from the foregoing, the teeth projecting from the sides of each dentigerous section form a bridge at the outermost portion of the conveyor curve arc, thus spanning the open gap formed by the separation of these sections and preventing the load hangers from falling into a gap or becoming snagged therein. Since it is possible to make each dentigerous section identical, carrying one-half of a spiral revolution, it has been found desirable to make one mold and to cast the sections in the mold out of aluminum, nylon, polyvinyl acetate, or other plastic or metal, as desired. Plastic can be used since the torque on the conveyor is carried to the greatest extent by cable 7, so that teeth 14, 14', etc., are employed mainly for the spanning purpose hereinabove outlined and to provide a continuous load-carrying groove.

We claim:
1. A curved section for a straight tubular screw conveyor for transporting load hangers, comprising,
   a series of axially-connected short, spaced cylindrical sections, each carrying a portion of a narrow continuous load-carrying screw groove disposed inwardly of the cylindrical wall surface,
   a series of axially-disposed teeth extending from the periphery at each end of said sections and designed to mesh with and to be separable axially from oppositely-directed similar teeth of adjacent sections, and
   a flexible load-carrying cable passing through and fitting snugly in said series of cylindrical sections and designed to hold together said sections and having ends for anchoring within ends of a straight conveyor.

2. A curved conveyor, comprising,
   a pair of straight lengths of a tubular conveyor disposed at an angle to each other and carrying a narrow groove screw disposed inwardly of the tubular wall surface,
   a series of axially-extending teeth projecting from the periphery at each adjacent end of said lengths,
   a series of axially-connected, short, spaced cylindrical sections disposed between the adjacent ends of said straight lengths, with each section carrying a portion of a narrow continuous load-carrying screw groove disposed inwardly of the cylindrical wall surface and connecting with the grooves of said straight lengths,
   a series of axially-extending teeth projecting from the periphery of each end of said sections and designed to mesh with and be separable axially from the projections on said straight lengths and to mesh with and be separable axially from oppositely-disposed similar teeth of adjacent sections,
   a flexible load-carrying cable passing through and fitting snugly in said series of cylindrical sections and designed to hold them together and having projecting ends adapted to fit into the ends of said straight lengths, and
   locking means on said straight length ends for locking said cable ends therewithin.

3. A curved conveyor, comprising,
   a pair of long straight lengths of a tubular conveyor disposed at an angle to each other and carrying a narrow groove screw disposed inwardly of the tubular wall surface,
   a series of axially-extending teeth projecting from the periphery at each adjacent end of said long lengths,
   a series of short, spaced, axially-connected cylindrical sections forming an arc of about 22°, each section carrying a portion of a narrow continuous load-carrying groove disposed inwardly of the cylindrical wall surface and connecting with the grooves in said straight lengths, each of said sections having axially-disposed teeth extending from the periphery at each end and designed to mesh with and be separable axially from oppositely-directed similar teeth of adjacent sections or teeth of straight lengths, as necessary to form a continuous conveyor,
   each of said series of sections alternating with a short length of a straight tubular length carrying a narrow continuous groove screw disposed inwardly of the tubular wall surface, all forming a curve, said short lengths also having similarly-extending and meshing and axially-separable teeth at their ends,
   a flexible load-carrying cable passing through and fitting snugly in said series of cylindrical sections and said short tubular lengths forming the curve, and designed to hold together said sections and short lengths, and having projecting ends adapted to fit into the ends of said long straight lengths, and
   locking means on said long straight length ends for locking said cable ends therein.

References Cited by the Examiner
UNITED STATES PATENTS

| | | | |
|---|---|---|---|
| 2,045,757 | 7/36 | Constantin | 198—213 |
| 2,515,366 | 7/50 | Zublin | 64—9 |
| 2,888,128 | 5/59 | Allen | 198—213 |

SAMUEL F. COLEMAN, *Acting Primary Examiner.*
WILLIAM B. LA BORDE, *Examiner.*